United States Patent [19]

Kurafuzi et al.

[11] Patent Number: 4,495,532
[45] Date of Patent: Jan. 22, 1985

[54] TAPE PLAYER

[75] Inventors: Takamasa Kurafuzi; Kimihide Tokura, both of Kouhoku, Japan

[73] Assignee: Tokyo Shibaura Denki Kabushiki Kaisha, Japan

[21] Appl. No.: 465,097

[22] Filed: Feb. 9, 1983

[30] Foreign Application Priority Data

Feb. 9, 1982 [JP] Japan .................. 57-19270

[51] Int. Cl.$^3$ .............. G11B 15/02; G11B 15/18
[52] U.S. Cl. .................... 360/71; 242/186; 360/74.1
[58] Field of Search .............. 242/186, 191; 360/71, 360/73, 74.1, 74.2

[56] References Cited

FOREIGN PATENT DOCUMENTS

| 49-102304 | 9/1974 | Japan . |
| 53-51713 | 5/1978 | Japan . |
| 55-128235 | 9/1980 | Japan . |
| 1451688 | 10/1976 | United Kingdom . |
| 2004403 | 3/1979 | United Kingdom . |
| 2049257 | 12/1980 | United Kingdom . |
| 2060237 | 4/1981 | United Kingdom . |
| 1594235 | 7/1981 | United Kingdom . |
| 2077481 | 12/1981 | United Kingdom . |
| 2079032 | 1/1982 | United Kingdom . |

Primary Examiner—George G. Stellar

Attorney, Agent, or Firm—Finnegan, Henderson, Farabow, Garrett & Dunner

[57] ABSTRACT

A tape operation mode changing mechanism for tape players. The mechanism is provided with a motor and gears for running a tape, a first rotary member adapted to rotate while the tape runs, a thrusting element driven in accordance with rotation of the first rotary member, a holding device, a rocking member held by the holding device and provided with first and second engagement portions, the rocking member being rockable about the holding device in response to the thrusting means thrusting against the first engagement portion while the tape runs, and a second rotary member adapted to rotate regardless of the running of the tape and provided with an engagement section capable of moving the rocking member when in engagement with the second engagement portion thereof. The engagement section of the second rotary member is prevented from engaging with the second engagement portion during rocking of the rocking member resulting from the thrusting means thrusting the first engagement portion while the tape runs, but does engage the second engagement portion when the tape stops running. In addition, the second rotary member is movable between first and second positions so as to move the rocking member in different positions. Movement of the rocking member is utilized to effect changes in the operation modes of the tape player.

20 Claims, 11 Drawing Figures

TAPE PLAYER

FIELD OF THE INVENTION

This invention relates to a tape player and, more particularly, to a tape player provided with a mechanism for automatically changing operation modes in response to a tape stop.

BACKGROUND OF THE INVENTION

Generally, tape players having an automatic shut-off or stopping device are well known in the art. An automatic shut-off device detects stoppage of a magnetic tape, for example, at the end of the running of the tape during play back, recording, fast forwarding, rewinding, etc., and is capable of returning various operating members of the tape player to a stopped or "off" position. In recent years, tape players having an automatic operation mode changing mechanism which operates in response to detection of the end of the tape have been developed. The automatic operation mode changing mechanism is useful, for example, for the so-called AUTO-PLAY operation or for a series operation such as first rewinding and then playing back, or in automatic reverse operation, to name just a few.

Conventional tape players equipped with an automatic operation mode changing mechanism have a disadvantage in that a malfunction in changing of the mode is apt to occur due to the fact that the tape stop detecting device only operates in certain modes and not in all operational modes. Further, conventional tape players of this kind have a disadvantage in that the mechanical arrangement of the tape player may be very complicated due to inclusion of the automatic operation mode changing mechanism. The complexity of the tape player has given rise to various problems, for example, high cost, reduced reliability, difficulties in manufacturing and maintenance, etc.

SUMMARY OF THE INVENTION

It is, therefore, an object of the present invention to construct a mechanism for reliably performing automatic operation mode changing.

Another object of the present invention is to provide a tape player equipped with an automatic operation mode changing mechanism which has a simple construction and which is easily manufactured.

According to the present invention, the tape player is provided with a chassis; means for running a tape, the tape running means being supported on the chassis; a first rotary member adapted to rotate while the tape runs; thrusting means driven by rotation of the first rotary member; holding means formed on said chassis; a rocking member held by the holding means and provided with first and second engagement portions, the first engagement portion being engagable with said thrusting means, the rocking member making a first movement relative the holding means in response to the thrusting means thrusting the first engagement portion during running of the tape; and a second rotary member adapted to rotate regardless of running of the tape and movable between first and second positions to move said rocking member into different positions, the second rotary member being provided with an engagement section for engaging with the second engagement portion of the rocking member; the second engagement portion of the rocking member being prevented from engaging with the second engagement section of the second rotary member during the first movement of the rocking member, but engaging with the second engagement section of the second rotary member once running of the tape has stopped with the rocking member making a second movement relative the holding means in response to rotation of the second rotary member for changing the operating mode of the tape player.

Additional objects and advantages of the present invention will become apparent to persons skilled in the art from a study of the following description and the accompanying drawings.

DESCRIPTION OF THE PREFERRED EMBODIMENTS

The present invention will be described in detail with reference to the drawings, FIG. 1 to FIG. 10. Throughout the drawings, like reference numerals will be used to designate like or equivalent elements.

Figure 1:
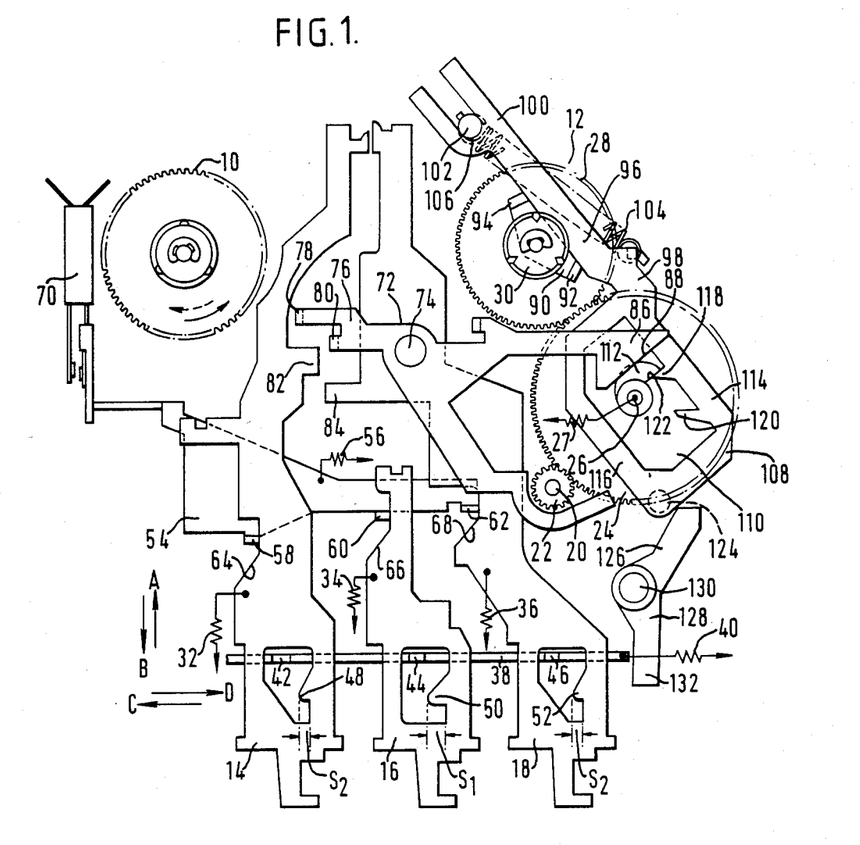
FIG. 1 is a schematic top plan view of a tape player according to a first embodiment of the present invention.

FIG. 1 schematically shows a fundamental arrangement of a tape player embodying the present invention. The tape player generally includes a supply reel rest 10, a take-up reel rest 12, a set of control rods for controlling the various operation modes of the tape player, for example, rewind control rod 14, play back control rod 16, fast-forward control rod 18. It is to be understood that the tape player may include other control rods for stopping, recording and temporarily stopping or pausing without departing from the spirit or scope of the invention. A capstan 20 is provided which rotates at a constant speed by means of a motor (not shown) and to which a capstan gear 22 is secured. An idler gear 24 is pivotally mounted on an idler shaft 26 which is slidably mounted on a chassis (not shown) and is biased by a spring 27 toward the left in the drawing. This biasing of spring 27 serves to connect idler gear 24 to both capstan gear 22 and to a take-up reel gear 28 to which is frictionally engaged a take-up reel spindle 30.

Control rods 14, 16, and 18 are slidably mounted on the chassis in the directions of arrows A and B, and are biased, respectively, by springs 32, 34 and 36 in the direction of arrow B. The control rods may selectively be locked in a forward position in the direction of arrow A by a lock plate 38. Lock plate 38 is biased in the direction of arrow D by a spring 40 and has locking bars 42, 44 and 46 corresponding, respectively, to each of control rods 14, 16 and 18. Control rods 14, 16 and 18 have hooks 48, 50 and 52 which are engagable with locking bars 42, 44 and 46, respectively. Hooks 48, 50 and 52 each has an inclined edge for sliding lock plate 38 against the biasing of spring 40 in the direction of arrow C when the lock plate engages any one of the hooks, and a barring edge parallel to lock plate 38, similar to conventional tape players. According to a preferred embodiment of the invention, the barring edge of hook 50 of play back control rod 16 is longer than the barring edge of either of hooks 48 and 52 of rewind and fast-forward control rods 14 and 18, respectively.

Rewind, play back and fast-forward control rods 14, 16 and 18, respectively, act upon a switch plate 54 which is slidably mounted on the chassis and biased by a spring 56 in the direction of arrow D. Switch plate 54 has engaging portions 58, 60 and 62 that are engagable, respectively, with inclined edges 64, 66 and 68 formed on rewind, play back and fast-forward control rods 14, 16 and 18. These inclined edges of rewind, play back and fast-forward control rods 14, 16 and 18, press against the corresponding engaging portion of switch plate 54 when any of the control rods are moved into an operating position in the direction of arrow A, thereby sliding switch plate 54 in the direction of arrow C against the bias of spring 56. As switch plate 54 moves in the direction of arrow C, it causes the contacts of a switch 70 to close which actuates the motor (not shown) so as to drive capstan 20 and capstan gear 22 in a counter-clockwise direction. The rotational driving force of capstan gear 22 is transmitted to take-up gear 28 through idler gear 24 when idler gear 24 is interconnected between capstan gear 22 and take-up reel gear 28. Thus, take-up reel rest 12 is driven in the counter-clockwise fashion through idler gear 24.

Figure 2:
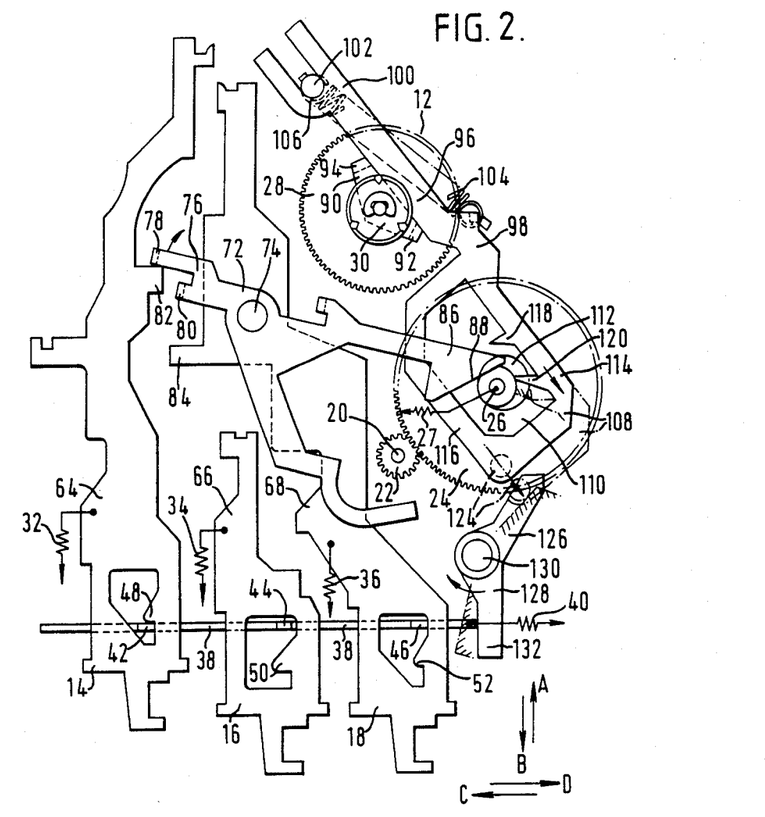
FIGS. 2-4 are schematic top plan views illustrating the operation of the automatic operation mode changing mechanism employed in the tape player of FIG. 1.

Rewind and fast-forward control rods 14 and 18 also act upon a select lever 72 which is rockably mounted on the chassis by a shaft 74. One arm 76 of select lever 72 has engaging portions 78 and 80 engageable, respectively, with corresponding engaging portions 82 and 84 provided on rewind and fast-forward control rods 14 and 18. Another arm 86 of select lever 72 is provided with an inclined edge 88 engageable with idler shaft 26. Select lever 72 is, as shown in FIG. 2, rocked in the clockwise direction about shaft 74 by engagement of either one of engagement portions 82 and 84 of rewind and fast-forward control rods 14 and 18 with the corresponding one of engagement portions 78 and 80 of select lever 72 when rewinding or fast-forwarding control rod 14 or 18 is moved in the direction of arrow A and locked by lock plate 38. This rocking motion causes arm select lever 72 to thrust its inclined edge 88 downward against idler shaft 26 and, due to the direction of the incline of edge 88, idler shaft 26 is urged against the biasing of spring 27. Accordingly, idler gear 24 is caused to move in a clockwise manner about capstan gear 22 and is thereby disengaged from take-up reel gear 28 by the action of select lever 72. As noted above, this occurs when either rewind or fast-forward control rod 14 or 18 is forwarded in the direction of arrow A.

Figure 3:
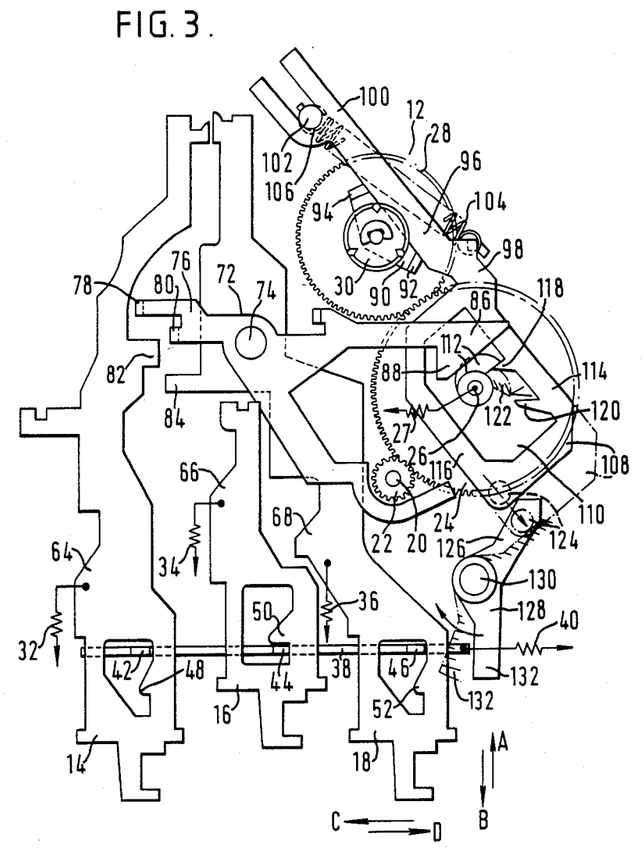

As shown in FIG. 2, movement of rewind control rod 14 into a locked position with lock plate 38 interrupts the transmission of driving force from capstan gear 22 to take-up reel rest 12, and instead actuates supply reel rest 10 so as to cause reel rest 10 to rotate in a clockwise fashion by means known in the art. Take-up reel rest 12 thus no longer rotates in a counter-clockwise direction via capstan gear 22, but is instead driven in a clockwise direction due to the magnetic tape (not shown) running from a tape reel (not shown) mounted on take-up reel rest 12 to another tape reel (not shown) mounted on supply reel rest 10 since supply reel rest 10 is being driven in the clockwise direction. Therefore, rewind operation mode is accomplished. Fast-forward control rod 18, when locked into position by lock plate 38, also interrupts transmission of the driving force from capstan gear 22 to take-up reel rest 12 through idler gear 24, and actuates take-up reel rest 12 to rotate in a fast speed in the counter-clockwise direction in a manner well known in the art. Therefore, fast-foward operation mode is accomplished. As shown in FIG. 3, play back control rod 16, when moved into a locked position with lock plate 38 is, however, free from select lever 72 and thus fails to interrupt the transmission of driving force from capstan gear 22 to take-up reel rest 12. Therefore, the play back operation mode is accomplished.

Figure 4:
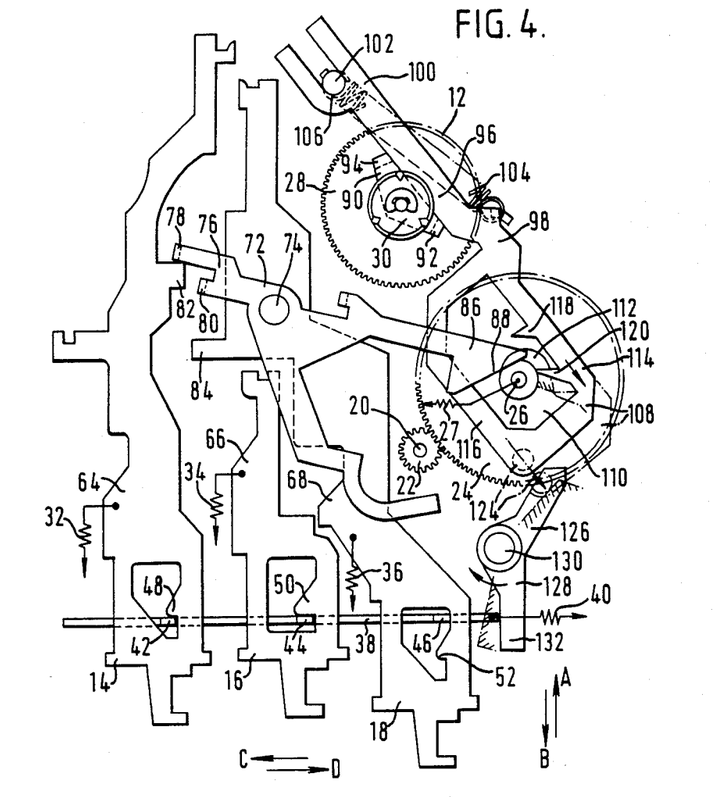

As shown in FIG. 4, rewind control rod 14 can be locked in position by lock plate 38 together with play back control rod 16. In that case, select lever 72 is rocked by rewind control rod 14 in a clockwise direction and disengages idler gear 24 from take-up reel gear 28. Therefore, the rewind operation mode is accomplished rather than the play back operation mode.

Referring back to FIG. 1, in accordance with the present invention, take-up reel rest 12 is provided with a thrust member 90 which is frictionally engaged at the center portion thereof with take-up reel spindle 30 so as to rotate in accordance with the rotation of take-up reel spindle 30. Thrust member 90 has at the ends thereof a pair of first and second thrust portions 92 and 94. First and second thrust portions 92 and 94 face a first engagement portion 96 of a detection lever 98.

Detection lever 98 is slidably connected at a forked joint portion 100 thereof to a shaft 102 secured to the chassis and is biased by a spring 104 such that a base portion 106 of forked joint portion 100 engages shaft 102. Detection lever 98 has a second engagement portion 108 which corresponds to idler gear 24. Second engagement portion 108 of detection lever 98 has an elongated opening 110 in which a cam plate 112 is received, the cam plate being secured to idler gear 24. Second engagement portion 108 also has a pair of first and second flange portions 114 and 116, parallel with each other and with first engaging portion 96. First flange portion 114 has a pair of first and second engaging claw portions, 118 and 120, respectively, formed along its inner periphery and arranged for engagement with cam portion 122 of cam plate 112. First engaging claw portion 118 is adapted to engage cam plate 112 when idler gear 24 is engaged with take-up reel gear 28, while second engaging claw portion 120 is adapted to engage cam plate 112 when idler gear 24 is disengaged from take-up reel gear 28 by select lever 72.

Reference is made now to FIG. 3 which shows the tape player in the play back mode. While take-up reel rest 12 is rotating in the counter-clockwise direction, thrust portion 92 of thrust member 90 thrusts against first engagement portion 96 of detection lever 98. Detection lever 98 is rocked about shaft 102 in the counter-clockwise direction resulting from thrust member 90 thrusting against first engagement portion 96. Thus, second engagement portion 108 of detection lever 98 is rocked about shaft 102 so as to engage second flange portion 116 with came plate 112 that is rotating with idler gear 24 and to prevent engagement of cam portion 122 of cam plate 112 with first engaging claw portion 118. However, when cam portion 122 engages with second flange portion 116 of second engagement portion 108, second engagement portion 108 of detection lever 98 is thrust so as to rock detection lever 98 in the clockwise direction. Thus, during rotation of take-up reel rest 12, detection lever is alternately rocked counter-clockwise and clockwise, respectively, by thrust member 90 and by cam plate 112.

When take-up reel spindle 30 has stopped due to reaching the end of the tape, thrust member 90 no longer thrusts detection lever 98. Thus, cam portion 122 of cam plate 112, which continues to rotate, thrusts against second flange portion 116 of second engagement portion 108 so as to rock detection lever 98 in a clockwise direction where it is left in position. That is, detection lever 98 is left in the position to which it is rocked by cam portion 122 of cam plate 112. In that position, first engaging claw portion 118 is in the rotation path of cam plate 112 such that cam portion 122 engages first engaging claw portion 118 and thrusts detection lever 98 against spring 104. In so doing, base portion 106 of forked joint portion 100 is pulled away from shaft 102.

Detection lever 98 has at its free end a drive pin 124. Drive pin 124 faces one end 126 of a lever 128 which is rockably mounted on a shaft 130 secured to the chassis. The other end 132 of lever 128 faces the right end of lock plate 38. Drive pin 124 of detection lever 98 engages with the one end 126 of lever 128 and rocks lever 128 about shaft 130 in the clockwise direction as a result of the above-described movement of detection lever 98. Lever 128 then thrusts its end 132 against lock plate 38 in the direction of arrow C. Detection lever 98 is slid by cam plate 112 a distance sufficient so as to disengage locking bar 44 of lock plate 38 from hook 50 of reproduction control rod 16. Accordingly, play back control rod 16 returns to its stationary position due to the biasing force of spring 34. Therefore, the play back operation mode of the tape player shown in FIG. 3 is automatically shut off at the end of the tape.

Referring now to FIG. 4 which shows the tape player in the AUTO-PLAY operation mode, idler gear 24 is disengaged from take-up reel gear 28 by select lever 72 so that cam plate 112 engages second engaging claw portion 120 of detection lever 98. Take-up reel rest 12 is now driven at a fast speed in the clockwise direction, in the manner described above. Accordingly, first the tape rewind operation is performed. Thrust portion 94 of thrust member 92 thrusts first engagement portion 96 of detection lever 98 in a clockwise direction about take-up reel spindle 30 while the tape runs from the side of take-up reel rest 12 to the side of supply reel rest 10 (not shown). Detection lever 98 is alternately rocked about shaft 102 in the counter-clockwise direction by thrust member 90 and in the clockwise direction by cam plate 112 while the tape runs, in a manner similar to that of the play back operation mode illustrated in FIG. 3. When the tape ends and thrust member 90 fails to continue to thrust detection lever 98, cam portion 122 of cam plate 112 engages with second engaging claw portion 120 of detection lever 98 and thrusts detection lever 98 forwardly along the length of detection lever 98, as hereinbefore described with respect to the play back operation mode. In similar fashion, as above described, lock plate 38 is slid in the direction of arrow C in accordance with the sliding movement of detection lever 98. The sliding distance of lock plate 38 in the AUTO-PLAY operation mode is, however, different from that in the reproduction operation mode as described hereinafter.

Figure 5A:
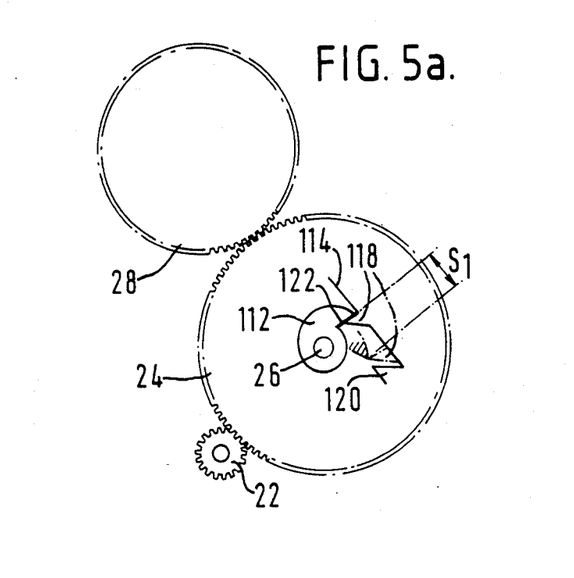
FIGS. 5a and 5b are partial top plan views of the rocking member of FIG. 1.
Figure 5B:
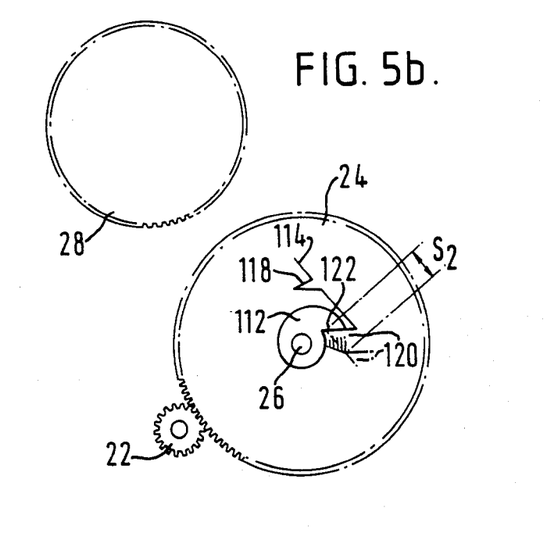

Referring now to FIGS. 5a and 5b, it is to be seen that first and second engaging claw portions 118 and 120 of detection lever 98 are different from one another as to their shape. First engaging claw portion 118 has an engaging edge which makes nearly a right angle with first flange portion 114 of second engagement portion 108, while second engaging claw portion 120 has an engaging edge which makes an acute angle with first flange portion 114. Therefore, as shown in FIG. 5a, cam portion 122 of cam plate 112 first meets with the engaging edge of first engaging claw portion 118 when the face of cam portion 122 is at a right angle to first flange portion 114. Then cam plate 112 thrusts first engaging claw portion 118 and detection lever 98 a distance S1 until cam portion 122 disengages from the tip of first engaging claw portion 118.

In comparison, as shown in FIG. 5b, cam portion 122 of cam plate 112 first meets with the engaging edge of second engaging claw portion 120 when cam portion 122 is at an obtuse angle with respect to first flange portion 114, i.e. cam portion 122 rotates to an obtuse angle past the right angle corresponding portion at which the engaging edge of first engaging claw portion 118 was first met. Cam plate 112 then thrusts second engaging claw portion 120 and detection lever 98 by a distance S2 until cam portion 122 goes away from the tip of second engaging claw portion 120. Cam portion 122 goes away from the tip of first and second claw portions 118 and 120 at a similar angular condition with respect to first flange portion 114. Accordingly, the sliding distance of detection lever 98 is the distance S1 for the play back operation mode shown in FIG. 3, and the distance S2 for the AUTO-PLAY operation mode shown in FIG. 4. Only the sliding of detection lever 98 by the distance S1 is sufficient to cause locking bar 44 to disengage from hook 50 of play back control rod 16, as described above.

Referring back to FIG. 4, lock plate 38 is slid in the direction of arrow C in response to drive pin 124 of detection lever 98 moving lever 128 as described above. The sliding of detection lever 98 by the distance S2 causes lock plate 38 to slide a distance sufficient for locking bar 42 to disengage from hook 48 of rewind control rod 14, but insufficient for locking bar 44 to disengage from hook 50 of play back control rod 16. Therefore, rewind control rod 14 returns to its original position in accordance with the biasing force of spring 32 while play back control rod 16 is left in a locked position by lock plate 28. Select lever 72 then rocks in the counter-clockwise direction, resulting from engaging portion 82 of rewind control rod 14 disengaging from engaging portion of select lever 72, so that select lever 72 allows idler gear 24 to engage with take-up reel gear 28. Accordingly, the tape player is automatically changed from tape rewind operation to play back operation, i.e. the AUTO-PLAY operation mode is accomplished. The operation of the tape player thereafter is performed in similar manner to that described above with respect to the play back operation mode shown in FIG. 3.

The automatic mode changing of a tape player in only the rewind operation mode, as shown in FIG. 2, or the fast-forward operation mode is performed similarly to the first step in the AUTO-PLAY operation mode. However, the tape rewind or fast-forward operation mode is changed to only the stop mode, and not to the play back mode, when the end of the tape is reached at either take-up reel rest 12 or supply reel rest 10, respectively.

Figure 6:
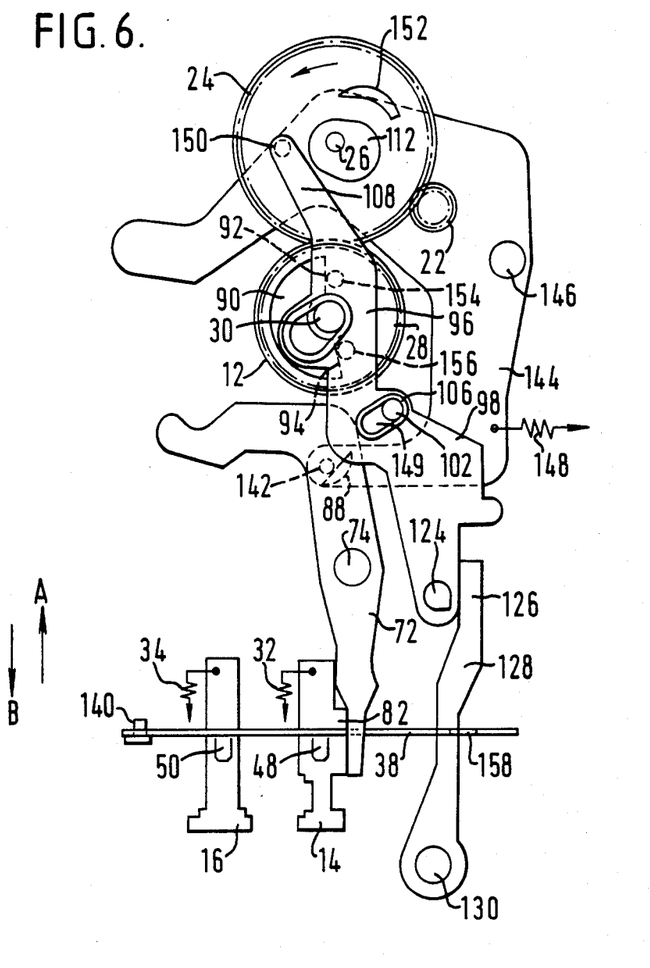
FIGS. 6 and 7 are schematic top plan views of a second embodiment of a tape player in accordance with the present invention.

FIG. 6 shows another embodiment of the present invention. As shown in FIG. 6, rewind control rod 14 and play back control rod 16 are mounted on a chassis (not shown) and are slidable in the directions of arrows A and B. Control rods 14 and 16 are biased in the direction of arrow B by springs 32 and 34, respectively. Controls rods 14 and 16, repectively, actuate the tape player in the rewind operation mode and the play back operation mode when they are moved forward in the direction of arrow A. Control rods 14 and 16 have slanting hooks 48 and 50, respectively, which are able to rock lock plate 38 about a shaft 140 in a vertical direction perpendicular to the plane of the drawing (or the paper) of FIG. 6. Thus, control rods 14 and 16 may be moved forward in the direction of arrow A and be locked by lock plate 38 after slanting hooks 48 and 50 having passed through lock plate 38. Although hooks 48 and 50 of control rods 14 and 16 have the same height as each other, hook 50 of play back control rod 16 rotates lock plate 38 to a greater degree than hook 48 of rewind control rod 14 because play back control rod 16 is closer to shaft 140 than rewind control rod 14.

Rewind control rod 14 has engaging portion 82 which engages with inclined engaging portion 78 of select lever 72 and rocks select lever 72 in the counter-clockwise direction about shaft 74 secured on the chassis when rewind control rod 14 is moved forward in the direction of arrow A. Select lever 72 has an engaging portion 88 which engages with a pin 142 secured on one end of an idler lever 144 so as to rock idler lever 144 in the clockwise direction about a shaft 146 secured on the chassis in accordance with the rocking of select lever 72. Idler lever 144 has mounted at its other end idler gear 24. Idler gear 24 is interconnected between both capstan gear 22, which is rotatably mounted on the chassis, and take-up reel gear 28, which is frictionally engaged with take-up reel spindle 30 of take-up reel rest 12 when idler lever 144 is rocked in the counter-clockwise direction by the biasing of a spring 148. Conversely, idler gear 24 is disconnected from take-up reel gear 28 in accordance with the rocking of idler lever 144 in the clockwise direction against spring 148. Play back control rod 16 does not engage select lever 72 so that idler gear 24 is always interconnected between both capstan gear 22 and take-up reel gear 28 except when rewind control rod 14 is in a locked position with lock plate 38.

Take-up reel rest 12 is provided with thrust member 90 which is frictionally engaged at its center portion with take-up reel spindle 30 and rotatable in accordance with the rotation of take-up reel spindle 30. Thrust member 90 has a pair of thrust portions 92 and 94 at the ends thereof. Thrust portions 92 and 94 face first engagement portion 96 of detection lever 98. Detection lever 98 has at its center portion an elongated opening 149 in which is received shaft 102 secured to the chassis. Detection lever 98 is biased at its center portion by spring 104 (not shown) towards the left-downward direction in the drawing so as to bring bearing portion 106 of detection lever 98 at one end of elongated opening 149 into engagement with shaft 102.

Detection lever 98 has second engagement portion 108 which corresponds to idler gear 24. Second engagement portion 108 of detection lever 98 has a pin 150 which extends to engage cam plate 112 secured to idler gear 24. There is also provided an engaging plate 152 integral with idler gear 24. Cam plate 112 has a round cam face in an eccentric relationship to idler shaft 26. Engaging plate 152 is located in a position apart from cam plate 112, but intersecting the rotational path of cam plate 112. During rotation of take-up reel spindle 30 in the clockwise direction, thrust portion 92 of thrust member 90 thrusts engaging pin 154 secured to second engagement portion 96 in a clockwise direction about take-up reel spindle 30. Detection lever 98 is therefore rocked about shaft 102 in a counter-clockwise direction by the thrusting force of thrust member 90 so that engaging pin 150 of second engagement portion 108 comes into contact with the round cam face of cam plate 112. Because cam plate 112 is continuously rotating, detection lever 98 is alternately rocked about shaft 102 in clockwise and counter-clockwise directions with pin 150 being kept in constant contact with the round cam face of cam plate 112.

When take-up reel rest 12 is stopped at the tape end, thrust portion 92 of thrust member 90 no longer thrusts against engaging pin 154 of first engaging portion 96 of detection lever 98. Pin 150 of second engaging portion 108 of detection lever 98 is left apart from cam plate 112 in a position on the path of engaging plate 152 once cam plate 112 has rocked pin 150 in a counter-clockwise direction about shaft 102. Engaging plate 152 then engages with pin 150 of detection lever 98 and begins to push pin 150 farther away in the counter-clockwise direction about shaft 102 that is in contact with bearing portion 106. Therefore, second engaging portion 96 of detection lever 98 is pressed against take-up reel spindle 30 and, upon further rotation of idler gear 24, engaging plate 152 pushes pin 150 even farther away so that detection lever 98 is rocked about take-up reel spindle 30 in contact with second engaging portion 96 against the bias of spring 104. During this rocking of detection lever 98 about take-up reel spindle 30, bearing portion 106 of detection lever 98 is disengaged from shaft 102, as permitted by elongated opening 140.

Detection lever 98 has at its other end drive pin 124 which faces free end 126 of lever 128 that is rockably mounted on shaft 130 secured to the chassis. A center portion of lever 128 is directly under a free end of lock plate 38. Drive pin 124 of detection lever 98 engages with free end 126 of lever 128 and rocks lever 128 about shaft 130 in the clockwise direction in accordance with the rocking movement of detection lever 98 about take-up reel spindle 30. Lock plate 38 has at its underside, corresponding to lever 128, a slanting edge 158 which protrudes downward (perpendicular to the plane of the drawing) and gradually slants rightward in the drawing. Lever 128, in rocking in a clockwise direction, rocks lock plate 38 upwardly about shaft 140 such that lock plate 38 is disengaged from slanting hook 50 of play back control rod 16 which allows play back control rod 16 to return its original position due to the biasing force of spring 34. Thus, the play back operation mode of the tape player is automatically shut off at the tape end.

Figure 7:
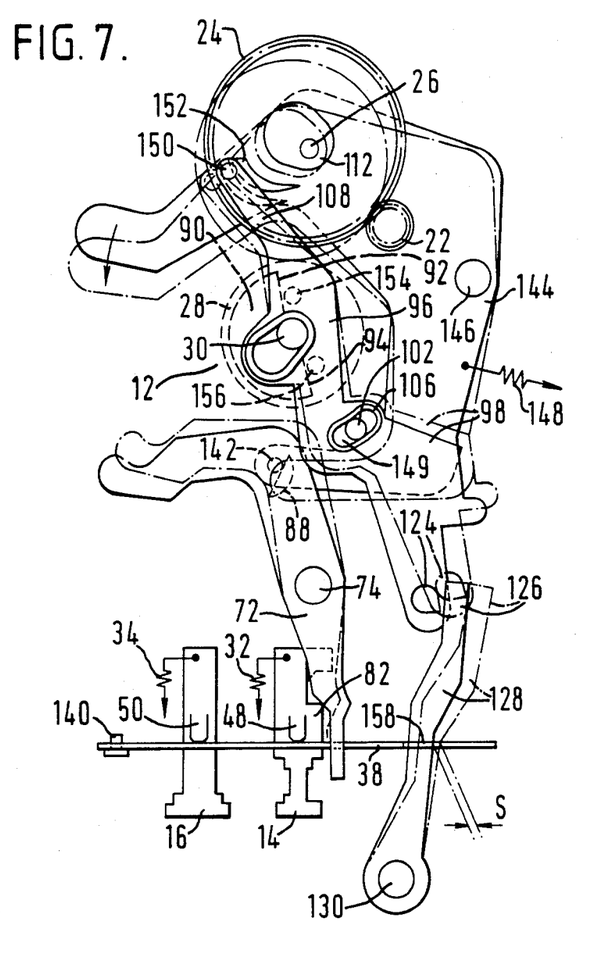

Referring now to FIG. 7 which shows the tape player in the AUTO-PLAY operation mode, idler gear 24 is disengaged from take-up reel gear 28 by select lever 72 rocking idler lever 144 about shaft 146 in the counter-clockwise direction. Take-up reel rest 12 thus fails to be driven by idler gear 24, but instead is driven by the tape running from the side of take-up reel rest 12 to the side of the supply reel rest (not shown). Take-up reel rest 12 therefore rotates in the counter-clockwise direction during the rewind operation so that thrust portion 94 of thrust member 90 thrusts against engaging pin 156 of first engaging portion 96 of detection lever 98. Detection lever 98 is thereby rocked about shaft 102 in the clockwise direction in contact with bearing portion 106. Pin 150 of second engaging portion 108 of detection lever 98 is also pushed against cam plate 112 in accordance with the thrusting force of thrust member 90. Accordingly, the rocking movement of detection lever 98 at the tape end is performed in a similar fashion to that in the play back operation described above. However, the overall location of the rocking movement of detection lever 98 in the rewind operation is slightly shifted from that in the play back operation in a clockwise direction about shaft 102 and take-up reel spindle 30 in that idler gear 24 is now apart from take-up reel rest 12. Therefore, lever 128 is moved leftwardly by detection lever 98 during the rewind operation relative the location of lock plate 38 by a distance S from that in the play back operation. The rocking movement of lever 128 in the rewind operation slightly rotates lock plate 38 about shaft 140 albeit sufficiently to release slanting hook 48 of rewind control rod 14 from lock plate 38, but insufficiently to release slanting hook 50 of play back control rod 16. Accordingly, the tape player is automatically changed from the rewind operation to the play back operation, i.e. the AUTO-PLAY operation mode is performed. The operation of the tape player thereafter is performed in a similar fashion to that of the play back operation described and illustrated with respect to FIG. 6.

The automatic mode changing of the tape player when in the rewind operation mode only (play back control rod 16 is not depressed) is performed in a fashion similar to the first step in the AUTO-PLAY operation mode. However, in that case, the tape rewind operation mode is changed to the stop mode at the tape end. The tape player may also be provided with a fast-forward operation mechanism in addition to the rewind operation mechanism, in which case the automatic mode changing for the fast-forward operation mode can be performed in a fashion similar to that described above for the rewind operation mode.

Figure 8:
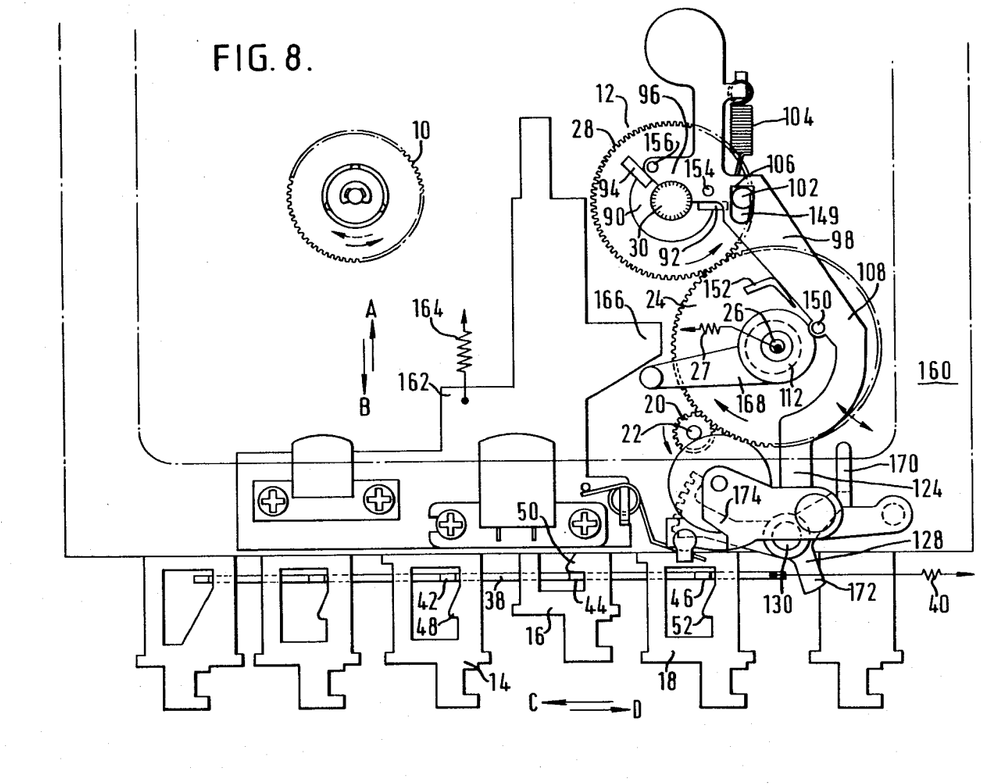
FIG. 8 is a schematic top plan view of a third embodiment of a tape player in accordance with the present invention.

FIG. 8 shows a further embodiment of the present invention. Rewind control rod 14, play back control rod 16 and fast-forward control rod 18 are mounted on a chassis 160 and slidable in the directions of arrows A and B. Control rods 14, 16 and 18 are biased in the direction of arrow B by springs 32, 34 and 36, respectively, as shown in FIG. 1. Control rods 14, 16 and 18 actuate the tape player into the rewind operation mode, play back operation mode and fast-forward operation mode, respectively, when they are forwarded in the direction of arrow A. Control rods 14, 16 and 18 have hooks 48, 50 and 52, respectively, formed in a manner similar to those of the tape player shown in FIG. 1. Thus, control rods 14, 16 and 18 may be locked in a forward position in the direction of arrow A by lock plate 38. Lock plate 38 is biased by spring 40 in the direction of arrow D and has locking bars 42, 44 and 46 engagable with hooks 48, 50 and 52, respectively, of control rods 14, 16 and 18. Locking bars 42, 44 and 46 are formed in a fashion similar to those of the tape player shown in FIG. 1. Play back control rod 16 allows a head chassis 162 to be moved forward in the direction of arrow A in the direction of a biasing force provided by a spring 164; otherwise head chassis 162 is retained in the direction of arrow B against spring 164. Head chassis 162 has an idler restricting portion 166 which corresponds to an idler rod 168 secured to idler shaft 26. dler restricting portion 166 of head chassis 162 does not engage idler rod 168 when head chassis 162 is moved forward in the direction of arrow A. Idler shaft 26 is biased in the direction of arrow C by spring 27 so as to connect idler gear 24, rotatably mounted to idler shaft 26, with both capstan gear 22 and take-up reel gear 28.

Head chassis 162 is thrust in the direction of arrow B against the bias of spring 164 when rewind control rod 14 or fast-forward control rod 18 is moved forward in the direction of arrow A, regardless of whether play back control rod 16 is also moved forward in the direction of arrow A. Accordingly, idler restricting portion 166 of head chassis 162 engages with idler rod 168 and thrusts idler gear 24 in the direction of arrow D against spring 27 when either rewind control rod 14 or fast-forward control rod 18 is locked in the forward position by lock plate 38. This causes idler gear 24 to rock about capstan gear 22 so as to disengage from take-up reel gear 28.

Take-up reel rest 12 is provided with thrust member 90 which is frictionally engaged with take-up reel spindle 30 so as to rotate therewith. Thrust member 90 has a pair of thrust plates 92 and 94 at the ends thereof. Thrust plates 92 and 94 both face first engagement portion 96 of detection lever 98. Detection lever 98 has at its center portion an elongated opening 149 in which is received shaft 102 secured to chassis 160. Detection lever 98 is biased by spring 104 so as to engage bearing portion 106 at one end of elongated opening 149 of detection lever 98 with shaft 102. Detection lever 98 has a second engagement portion 108 which corresponds to idler gear 24. Second engagement portion 108 of detection lever 98 has a pin 150 which faces cam plate 112 secured to idler gear 24. Cam plate 112 has a round cam face in an eccentric relationship to idler shaft 26. Idler gear 24 also has an engaging plate 152 integral therewith. Engaging plate 152 is located in a position separated from cam plate 112, but intersecting the path of rotation of cam plate 112.

During clockwise rotation of take-up reel spindle 30, thrust plate 92 of thrust member 90 thrusts an engaging pin 154, which is secured to first engagement portion 96 of detection lever 98, in the counter-clockwise direction about take-up reel spindle 30. Detection lever 98 is then rocked about shaft 102 in the clockwise direction by the force of thrust member 90, causing engaging pin 150 of second engagement portion 108 to engage the round cam face of cam plate 112. Because cam plate 112 is continuously rotating, detecting lever 98 is alternately rocked about shaft 102 in clockwise and counter-clockwise directions since engaging pin 150 is kept in contact with cam plate 112.

When take-up reel rest 12 stops upon reaching the tape end, thrust plate 92 of thrust member 90 no longer thrusts engaging pin 154 of first engagement portion 96 of detection lever 98. Engaging pin 150 of second engagement portion 108 is then left in the path of engaging plate 152 such that engaging plate 152 begins to push engaging pin 150, causing counter-clockwise rotation of detection lever 98 about shaft 102 in contact with bearing portion 106. Therefore, first engagement portion 96 of detection lever 98 is pressed against take-up reel spindle 30. Upon further rotation of idler gear 24, engaging plate 152 pushes engaging pin 150 farther away so that detection lever 98 begins to rock about take-up reel spindle 30 by virtue of the contact with second engagement portion 96 and against the biasing of spring 104. Continued rocking of detection lever 98 about take-up reel spindle 30 causes bearing portion 106 of detection lever 98 to become disengaged from shaft 102. Elongated opening 148 allows the rocking of detection lever 98 about take-up reel spindle 30. Detection lever 98 has a drive portion 124 at the free end of second engagement portion 108.

Figure 9:
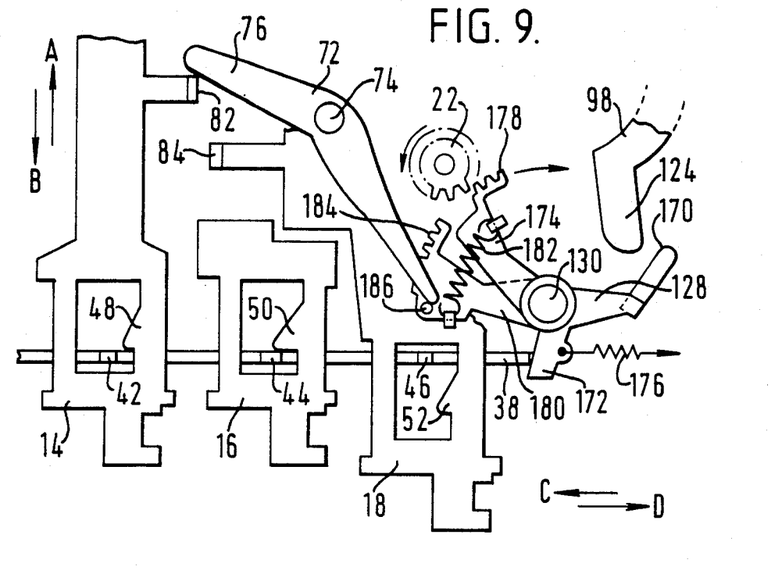
FIGS. 9 and 10 are partial top plan views illustrating the operation of the automatic operation mode changing mechanism of the tape player of FIG. 8.

Referring now to FIG. 9, drive portion 124 of detection lever 98 corresponds to lever 128 which is rockably mounted to shaft 130 secured to chassis 160. Lever 128 has three arms 170, 172 and 174. First arm 170 faces drive portion 124 of detection lever 98, second arm faces the right end of lock plate 38, and third arm 174 corresponds to capstan gear 22. Lever 128 is biased by spring 176 in the counter-clockwise direction so as to prevent accidental engagement between third arm 174 and capstan gear 22. Third arm 174 has a short gear section 178 engagable with capstan gear 22. Drive portion 124 of detection lever 98 pushes first arm 170 when detection lever 98 is rocked in the counter-clockwise direction by engaging plate 152. Drive portion 124 continues rocking lever 128 in the clockwise direction until short gear section 178 enters into engagement with capstan gear 22. After that, capstan gear 22 continues to rock lever 128 so that second arm 172 pushes against lock plate 38 and slides the lock plate in the direction of arrow C.

Lever 128 is accompanied by another lever 180 which is also rockably mounted on shaft 130 and which is coupled to third arm 174 by a spring 182 therebetween. Lever 180 has a long gear section 184, also engageable with capstan gear 22, and a pin 186. Pin 186 is engageable with one end of select lever 72 whose other end is engageable with engaging portions 82 and 84 of rewind and fast-forward control rods 14 and 18, respectively. When rewind control rod 14 or fast-forward control rod 18 is locked in position by lock plate 38, select lever 72 is rocked in the clockwise direction by engaging portion 82 or 84 so that end of select lever 72 is moved into a position so as to engage pin 186 and thus restrict the rocking of lever 180 in the clockwise direction. Therefore, in the rewind or fast-forward operation mode, only lever 128 is rocked and short gear section 178 of third arm 174 is engaged with capstan gear 22 as the result of rocking of detection lever 98 about take-up reel spindle 30. Due to the short length of short gear section 178, lever 128 is rocked by capstan 22 only a relatively small angle so that lock plate 38 is slid by second arm 172 in the direction of arrow C only a short distance. On the other hand, in the play back operation mode, lever 180 is not blocked by select lever 72, but instead is rocked together with lever 128 such that long gear section 184 engages with capstan gear 22 to rock lever 128 through a relatively large angle. Lock plate 38 is then slid in the direction of arrow C a correspondingly long distance.

Figure 10:
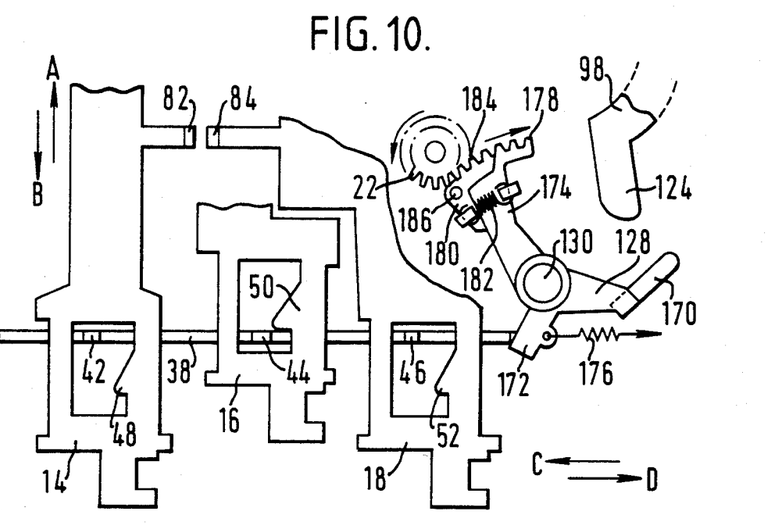

Referring to FIG. 10 which shows the tape player in AUTO-PLAY operation mode, the sliding of lock plate 38 by the aforementioned short distance is sufficient for locking bar 42 or 46 to be disengaged from hook 48 or 52 of rewind control rod 14 or fast-forward control rod 18, but insufficient for locking bar 44 to be disengaged from hook 50 of play back control rod 16. After either rewind control rod 14 or fast-forward control rod 18 has been released from lock plate 38 in the AUTO-PLAY operation mode, the tape player is automatically changed into the play back operation mode. On the other hand, the sliding of lock plate 38 by the aforementioned long distance is sufficient for locking bar 44 to be disengaged from hook 50 of play back control rod 16. Thus, at the end of AUTO-PLAY operation, play back control rod 16 is returned to its original position and the tape player is stopped.

Inasmuch as the present invention is subject to many variables, modifications and changes in detail, it is intended that all matter contained in the foregoing description or shown in the accompanying drawings shall be interpreted as illustrative and not in a limiting sense. Accordingly, it should be evident to those skilled in the art that minor variations may be made in the disclosed embodiments without departing from the spirit and scope of the invention.

What is claimed is:

1. A tape player with operating mode changing mechanism, comprising:

a chassis;

means for running a tape, said tape running means being supported on said chassis;

a first rotary member adapted to rotate while the tape runs;

thrusting means driven by rotation of said first rotary member;

holding means formed on said chassis;

a rocking member held by said holding means and provided with first and second engagement portions, said first engagement portion being engagable with said thrusting means, said rocking member making a first movement relative said holding means in response to said thrusting means thrusting said first engagement portion during running of the tape; and a second rotary member adapted to rotate regardless of running of the tape and movable between first and second positions to move said rocking member into different positions, said second rotary member being provided with an engagement section for engaging with said second engagement portion of said rocking member, said second engagement portion of said rocking member being prevented from engaging with said second engagement section of said second rotary member during said first movement of said rocking member, but engaging with said second engagement section of said second rotary member when running of the tape has stopped with said rocking member making a second movement relative said holding means in response to rotation of said second rotary member for changing the operating mode of the tape player.

2. A tape player according to claim 1, wherein said thrusting means is a third rotary member adapted to rotate through frictional engagement with said first rotary member.

3. A tape player according to claim 2, wherein said second rotary member is provided with a cam portion rotatable in an eccentric relationship with said second rotary member; and said second engagement portion of said rocking member is pressed against said cam portion while said third rotary member thrusts said first engagement portion of said rocking member.

4. A tape player according to claim 3, further comprising:

first and second means arranged parallel with each other and movable between a third position and a fourth position for actuating said tape running means into operating conditions whereby said first rotary member is driven in first and second rotation conditions different from each other, said first actuating means actuating said tape running means and placing said second rotary member in said first position when said first actuating means is placed in said third position, and said second actuating means actuating said tape running means and placing said second rotary member in said second position when said second actuating means is placed in said third position regardless of said first actuating means being placed in said third position; and first and second means for shifting, respectively, said first and second actuating means from said third position to said fourth position; and wherein said rocking member is provided with a drive portion selectively moved by said second rotary member into fifth and sixth positions for driving said first and second shifting means, respectively, into operation in response to said second rotary member being in said first position and said second position, respectively.

5. A tape player according to claim 4, further comprising:

first and second means for locking said first and second actuating means, respectively, in said third position; and means for releasing said first and second actuating means from said first and second locking means; and wherein said first and second shifting means are first and second means for biasing, respectively, said first and second actuating means toward said fourth position; and said drive portion of said second rotary member selectively brings said first and second biasing means into operation as a result of said drive portion moving to said fifth and sixth positions.

6. A tape player according to claim 5, wherein said first and second locking means are, respectively, first and second bars having long and short barring passages for said first and second actuating means;

said releasing means is a slider carrying said first and second bars thereon, said slider being slidable in a direction along said barring passages of said bars; and said drive portion of said rocking member drives said slider in excess of said short barring passage but less than said long barring passage in response to said rocking member moving to said first position, and said drive portion drives said slider in excess of said long barring passage in response to said rocking member moving to said second position.

7. A tape player according to claim 6, wherein said first rotary member is a first reel rest adapted to mount a first tape reel for winding the tape.

8. A tape player according to claim 7, wherein said first reel rest is a take-up reel rest driven by said tape running means.

9. A tape player according to claim 8, wherein said second rotary member is an idler wheel connecting said tape running means to said take-up reel rest.

10. A tape player according to claim 7, wherein said first and second rotation conditions of said first reel rest are, respectively, rotations in a first direction and a second direction opposite to said first direction, and said first reel rest being driven in said first and second rotation directions, respectively, by said tape running means and by running of the tape.

11. A tape player according to claim 10, further comprising:

a second reel rest adapted to mount a second tape reel for winding the tape together with said first tape reel and for rotating said first reel rest in said second direction upon being driven by said tape running means: and wherein said second rotary member is an idler wheel selectively connecting said tape running means to said first reel rest.

12. A tape player according to claim 8, wherein said first and second rotation conditions of said take-up reel rest are, respectively, rotations at a slow speed and at a fast speed, said take-up reel rest being driven by said tape running means selectively at said slow speed and said fast speed.

13. A tape player according to claim 12, wherein said second rotary member is an idler wheel connecting said tape running means to said take-up reel rest while said first actuating means is locked in said third position by said locking means.

14. A tape player according to claim 10, wherein said third rotary member is provided with first and second thrusting portions respectively engageable with said first engagement portion of said rocking member in response to said first and said second rotation directions of said first reel rest, respectively.

15. A tape player according to claim 14, wherein said first engagement portion of said rocking member includes first and second engagement sections corresponding, respectively, to said first and second thrusting portions of said third rotary member.

16. A tape player according to claim 6, wherein said first and second positions of said second rotary member are angularly different from each other with respect to said holding means.

17. A tape player according to claim 6, wherein said first and second positions of said second rotary member are different from each other in distance from said holding means.

18. A tape player according to claim 17, wherein said second engagement portion of said rocking member includes first and second engagement sections selectively engagable with said engagement section of said second rotary member, said first and second engagement sections of said rocking member having long and short engaging passages, respectively, for engaging with said engagement section of said second rotary member.

19. A tape player comprising:

a chassis;

means for running a tape, said tape running means being supported on said chassis;

a first rotary member adapted to rotate while the tape runs;

thrusting means driven by rotation of said first rotary member;

a second rotary member adapted to rotate regardless of the running of the tape, said second rotary member having an engagement section rotatable therewith;

a holding means formed on said chassis;

a rocking member rockably held by said holding means, said rocking member including a driving portion and being provided with first and second engagement portions corresponding, respectively, to said thrusting means and to said engagement section of said second rotary member, said first engagement portion being thrust in one direction by said thrusting means and preventing engagement of said second engagement portion with said engagement section of said second rotary member while said first rotary member rotates, said drive portion being moved by said second rotary member due to engagement between said second engagement portion and said engagement section of said second rotary member while said second rotary member rotates;

first and second means movable in parallel with each other between a third position and a fourth position for actuating said tape running means into operation conditions of driving said first rotary member, respectively, in first and second rotation conditions different from each other, said first actuating means actuating said tape running means when only said first actuating means is in said third position, and said second actuating means actuating said tape running means when said second actuating means is in said third position regardless of said first actuating means being placed in said third position;

first and second means for biasing, respectively, said first and second actuating means from said third position to said fourth position;

first and second bars for locking, respectively, said first and second actuating means in said third position, said first and second bars having long and short barring passages engagable with said first and second actuating means;

a slider carrying said first and second bars thereon, said slider being slidable in a direction along said barring passages of said first and second bars.

a drive wheel;

rockably mounted trip means with first, second and third engagement portions corresponding, respectively, to said drive portion of said rocking member, said slider and said drive wheel, said trip means being rocked in one direction by said drive portion engaging said first engagement portion so as to engage said third engagement portion with said drive wheel, and being farther rocked in said one direction by said drive wheel so as to drive said second engagement portion into engagement with said slider; and means for changing the rocking amount of said trip means between a first condition of a small rocking angle and a second condition of a large rocking angle so that said second portion of said trip means may drive said slider, respectively, in excess of said short barring passage of said first bar but less than said long barring passage of said second bar and in excess of said long barring passage of said second bar in response to said second actuating means being in one of said third and fourth positions, respectively.

20. A tape player according to claim 19, wherein said rocking amount changing means comprises short and long engagement sections of said third engagement portion, each being mounted fixedly and movably, respectively, on said trip means and driven by said drive wheel in said small rocking angle and said large rocking angle, respectively, with said long engagement section being prevented from engaging with said drive wheel when said second actuating means are in said third position.

* * * * *